(12) United States Patent
Goparaju et al.

(10) Patent No.: US 9,092,741 B1
(45) Date of Patent: Jul. 28, 2015

(54) COGNITIVE PLATFORM AND METHOD FOR ENERGY MANAGEMENT FOR ENTERPRISES

(71) Applicant: AMBER FLUX PRIVATE LIMITED, Hyderabad (IN)

(72) Inventors: Muralidhar Goparaju, Hyderabad (IN); Vinulata Goparaju, Hyderabad (IN)

(73) Assignee: Amber Flux Private Limited, Hyderabad (IN)

( * ) Notice: Subject to any disclaimer, the term of this patent is extended or adjusted under 35 U.S.C. 154(b) by 0 days.

(21) Appl. No.: 14/325,381

(22) Filed: Jul. 8, 2014

(30) Foreign Application Priority Data

Apr. 21, 2014 (IN) .......................... 2026/CHE/2014

(51) Int. Cl.
*G06N 5/02* (2006.01)
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| 8,255,090 B2 * | 8/2012 | Frader-Thompson et al. .............................. 700/295 |
| 2011/0137763 A1 * | 6/2011 | Aguilar ........................... 705/30 |
| 2011/0161124 A1 * | 6/2011 | Lappinga et al. ............. 705/7.11 |
| 2014/0058572 A1 * | 2/2014 | Stein et al. .................... 700/291 |

* cited by examiner

*Primary Examiner* — Alan Chen
(74) *Attorney, Agent, or Firm* — Cittone and Chinta, LLP; Henry J. Cittone

(57) ABSTRACT

This invention is a platform and method for using cognition for managing enterprise energy needs. Cognitive platform allows for dynamic management of energy consumption, demand and baseline calculations by use of a cognitive platform and cognitive device. Employees as well as internal and external stakeholders can set performance indicators and monitor the parameters against the energy performance indicators. Based on the initial knowledge, the system identifies improvements in order to reach the energy key performance indicators. Depending on the feedback, the system learns and improves the accuracy of the predictions and suits them to a given industry or given enterprise scenario. Enterprise-wide energy and/or environmental management covers policies, planning, key performance indicators, goals, targets, works flows, user management, asset mapping, input-output energy flows, conservation options, performance management, analytics. The system and method allow for monitoring and verification by internal and/or external stakeholders.

14 Claims, 13 Drawing Sheets

COGNITIVE PLATFORM AND METHOD FOR ENERGY MANAGEMENT FOR ENTERPRISES

CROSS REFERENCE TO RELATED APPLICATIONS

This application claims priority to Indian Patent Application No: 2026/CHE/2014, filed Apr. 21, 2014, the disclosure of which is hereby incorporated by reference in its entirety.

FIELD OF THE INVENTION

This invention relates to dynamic energy management of all energy consuming equipment, and processes that impact management of energy and environmental performance of enterprises. Employees as well as internal and external stakeholders can set performance indicators and monitor the parameters against the energy performance indicators. Based on the initial knowledge, the system suggests improvement ideas in order to reach the energy key performance indicators. Depending on the feedback, the system learns and improves the accuracy of the predictions and suits them to a given industry or given enterprise scenario without much human intervention. It is a dynamic and self learning system and method that manages knowledge based on initial information and subsequent feedback about enterprise-wide energy and/or environmental management covering policies, planning, key performance indicators, goals, targets, works flows, user management, asset mapping, input-output energy flows, conservation options, performance management, analytics. The system and method allow for monitoring and verification by internal and/or external stakeholders.

BACKGROUND OF THE INVENTION

This invention relates to dynamic energy management of all energy consuming equipment, and process that impact management of energy and environmental performance of enterprises using a cognitive platform that has ability to sense parameters related to energy consumption of equipment and take decisions based on a rule-set and communicate the changed or new parameters to equipment to achieve energy efficiency.

Equipment can be any energy consuming equipment such as computer, boiler, furnace, heat exchanger, motor, fan, blower, pump, compressor, heating, ventilation and air-conditioning systems or any other equipment.

BRIEF DESCRIPTION OF THE PRIOR ART AND PROBLEM TO BE SOLVED

Management of energy and environmental resources by enterprises is emerging as a key consideration for business success. Earlier, energy management did not receive much attention as energy costs were not very significant and also most equipment were not able to provide the necessary data that can help in analysis and management. Now enterprises are focusing on energy consumption and environmental aspects due to increased costs and awareness of adverse impacts of excessive energy usage and corporate social responsibility.

Today's, energy suppliers and users have expectations on solving the complexity of management, scalability, fault tolerant, reliable fast integration of new technologies as well as attractive business models.

A number of energy management methods and systems are available in the market today that helps enterprises in energy management. U.S. Pat. No. 7,062,389 B2 provides for a system for managing energy consumption by equipment located at site. It provides for methods and systems for gathering consumption data from energy consuming equipment. U.S. Pat. No. 6,178,362 B1 provides for energy management for enterprises that have widely dispersed energy consuming factories or facilities. U.S. Pat. No. 8,589,112 B2 provides for analyzing and identifying steps for lowering energy consumption in buildings. US Patent application 2013/0185120 provides methods and systems for energy benchmarking for gap analysis. It teaches us how to compare different performance parameters of equipment of one plant against another plant.

These systems are mostly information processing systems based on passive and structured data. They can process structured data from multiple sources and provide analysis. They can help in periodical usage information related to energy consumption, efficiency; and send alarms to users in case of some boundary conditions are met or exceeded.

However, currently available methods and systems do not take automatic actions to improve energy efficiency, are not able to conduct dynamic simulation for energy generation & consumption. Specific energy consumption of equipment and thus of an enterprise depends on many factors like user behavior/habits, vendor supplied information, equipment vintage, equipment condition, maintenance quality, weather factors, production process, building envelope etc. Currently available methods and systems are able to consider only a small set of factors.

Their ability to accurately define/compare peer-groups; conduct consumption/demand analysis; recommend energy enhancement options with commercially viable return on investment etc., is very limited and they do not posses the ability to take automatic decisions and actions to improve energy efficiency.

Real life challenges in energy management are stochastic in nature. Artificial intelligence techniques like machine learning; cognition can help in effective energy management. As explained by Nikos Vlasis in the book "A concise introduction to multi-agent systems and distributed artificial intelligence", goal for a particular task is the desired state of the world. Planning is search through the state space for an optimal path to the goal. When the world is deterministic, graph search techniques can help arrive at the goal. However, in stochastic world, transitions between the states are non-deterministic and hence graph search techniques are not useful as uncertainty of transitions need to be taken into account while planning i.e., searching through the state space.

Some of the recent research is in the field of use of cognition, advanced statistics and artificial intelligence for energy monitoring. US Patent application 2013/0289788 A1 provides for energy disaggregation techniques for low resolution whole house energy consumption data where methods for creating an appliance signature based upon a low resolution whole house profile. European Patent application EP 2 026 299 A1 provides for cognitive electric power meter and method for decomposing an input power signal measured at the input power meter into its constituent individual loads without incurring home field installation costs, to allow provision of a detailed usage summary to consumers. US Patent application US 2010/0305889 A1 provides for non-intrusive appliance load identification using cascaded cognitive learning where by measuring an energy consumption signal and using publicly available information of a location, one can estimate probabilities of energized appliances and further analyzing individual loads and corresponding energy consumption of appliances.

However these are primarily focused towards gathering information from energy consuming equipment using cognition and structured data. They do not address the issues of decision making towards energy efficiency and management of unstructured data. Also, comprehensive energy management requires the ability to manage many more parameters than just the equipment. For example, organizational polices, human actions have a significant impact in specific energy consumption. This also requires active management of information related to unstructured data. Currently available methods and systems are passive in nature and have very limited or no capability to process unstructured data.

At present there is no comprehensive, intelligent learning system available in the marketplace that can help enterprises manage their energy needs efficiently.

One of the key variables for energy efficiency and savings calculation is baseline energy consumption. Traditional systems and methods are capable of calculating baseline energy consumption based on statistical techniques like regression. These techniques take historical data into consideration while arriving at baseline energy consumption. These systems and methods assume environmental factors that affect the energy consumption are deterministic in nature. In real life these factors change significantly over time.

For example, many enterprises implement various energy efficiency measures over a period of time. This brings the need for baseline energy consumption to involve assumptions about the future as well. An accurate baseline can be achieved only when baseline calculation is dynamic in nature to accommodate dynamic situations especially if the energy service of the analyzed subject has changed throughout the implementation of the energy efficiency measure.

An efficient and successful energy management need to include corporate commitment, appropriate energy management practices/processes promoted through energy awareness and training and meaningful metrics for tracking results, maintaining accountabilities and responding in a timely manner to variations etc.

This requires comprehensive end-to-end energy management methods and systems that are dynamic, intelligent, and self-learning.

With the advancements in technology, today a number of smart meters, smart devices are available that can track the energy consumption and transmit the information to energy management systems.

Also, with the increased use of software applications and proliferation of mobile networks, devices, software applications, Internet, cloud computing, social media applications increasing amounts of data are available for processing and decision making.

One of the most important challenges existing today is regarding the dramatic increase in data from various sources like consumption data from smart meters, weather and other environmental information from local machines, instruments, local weather stations, production data from Manufacturing Resource Planning Information Systems, automation systems, building occupancy levels, specific planned and unplanned events, dynamic pricing information from utility suppliers etc. Data from various sources need to be analyzed and meaningfully managed for the effective energy management.

However, present energy management systems being passive in nature, are unable to take advantage of these data as majority of it is unstructured, and dynamic in nature. Dynamic decision-making based on continuous learning helps in optimizing energy usage and costs. New business systems that incorporate cognitive functionality and increase energy efficiency through the use of dynamic energy management are needed.

The preferred embodiments of the present invention overcome the problems associated with the existing mechanisms for dynamic energy management by providing an easily implemented, cost effective, open-standards solution that has cognitive capabilities of self learning and decision making using statistical, artificial intelligence using initial knowledge and subsequent feedback.

OBJECTS OF THE INVENTION

The principal object of the present invention is to provide comprehensive dynamic energy management to enterprises, regardless of where the users may be located in the world and regardless of type, location and/or other characteristics of the energy consuming equipment that they would like to manage.

Another object of the present invention is to provide a device and method that is based on ability to sense parameters related to energy consumption of equipment, ability to decision making based on a rule-set and ability to communicate the changed or new parameters to equipment.

Another object of the present invention to provide a baseline energy consumption calculation method and system that is based on historical data as well as projected implementation plan of energy saving projects to enterprises. Baseline energy consumption can be calculated for equipment, facility, plant, department, and enterprise level.

SUMMARY OF THE INVENTION

According to the present invention, there is provided a method for managing energy in an enterprise, method comprising of
 Accepting, via cognitive platform for energy management, at least one input parameter related to energy consumption information of equipment and one energy key performance indicator related to the equipment, said parameters coming from a network
 Comparing, via a cognitive decision maker, the energy consumption information against energy key performance indicator and a historical statistics database comprising of historical information related to energy consumption of the said equipment and said energy key performance indicator
 Determining, via cognitive decision maker, a plan that results in at least one change to the equipment settings to change energy consumption of the equipment
 Providing the determined change via a network
 Updating the historical statistics database with the determined change in equipment settings The invention also provides for a system for managing energy in an enterprise, system comprising of
 Accepting, via cognitive platform for energy management, at least one input parameter related to energy consumption information of equipment and one energy key performance indicator related to the equipment, said parameters coming from a network
 Comparing, via a cognitive decision maker, the energy consumption information against energy key performance indicator and a historical statistics database comprising of historical information related to energy consumption of the said equipment and said energy key performance indicator Determining, via cognitive decision maker, a plan that results in at least one change to the equipment settings to change energy consumption of the equipment Providing the determined change via a network Updating the historical statistics database with the determined change in equipment settings The invention also provides for a device for managing energy consumption of equipment, device comprising of:

A sensor that can sense at least one input parameter related to energy consumption of the equipment An adaptor that has a rule set related to energy consumption A processor that determines at least one change to the equipment settings based on the rule set An actuator that can provide at least one change or new settings to the equipment or equipment controller The invention also provides for logic encoded in non-transitory media for execution and when executed by a processor operable to:

receive sensory input related to energy consumption of an energy consuming equipment via network process the received input using a cognition based analysis module comparing the received input with historical statistics to identify steps to improve energy efficiency communicate at least one of new settings, changed parameters, or instructions to the energy consuming equipment via network update the historical statistics with at least one of new settings, changed parameters or instructions related to the energy consuming equipment.

BRIEF DESCRIPTION OF THE DRAWINGS

To provide a more complete understanding of the present invention and features and advantages thereof, reference is made to the following description taken in conjunction with the accompanying drawings, like reference numerals indicate corresponding parts in the various figures. Elements illustrated in the figures have not necessarily been drawn to scale. For example, the dimensions of some of the elements are exaggerated relative to the other elements. Embodiments incorporating teachings of the present disclosure are shown and described with respect to the drawings presented herein, in which.

DETAILED DESCRIPTION

Figure 1:
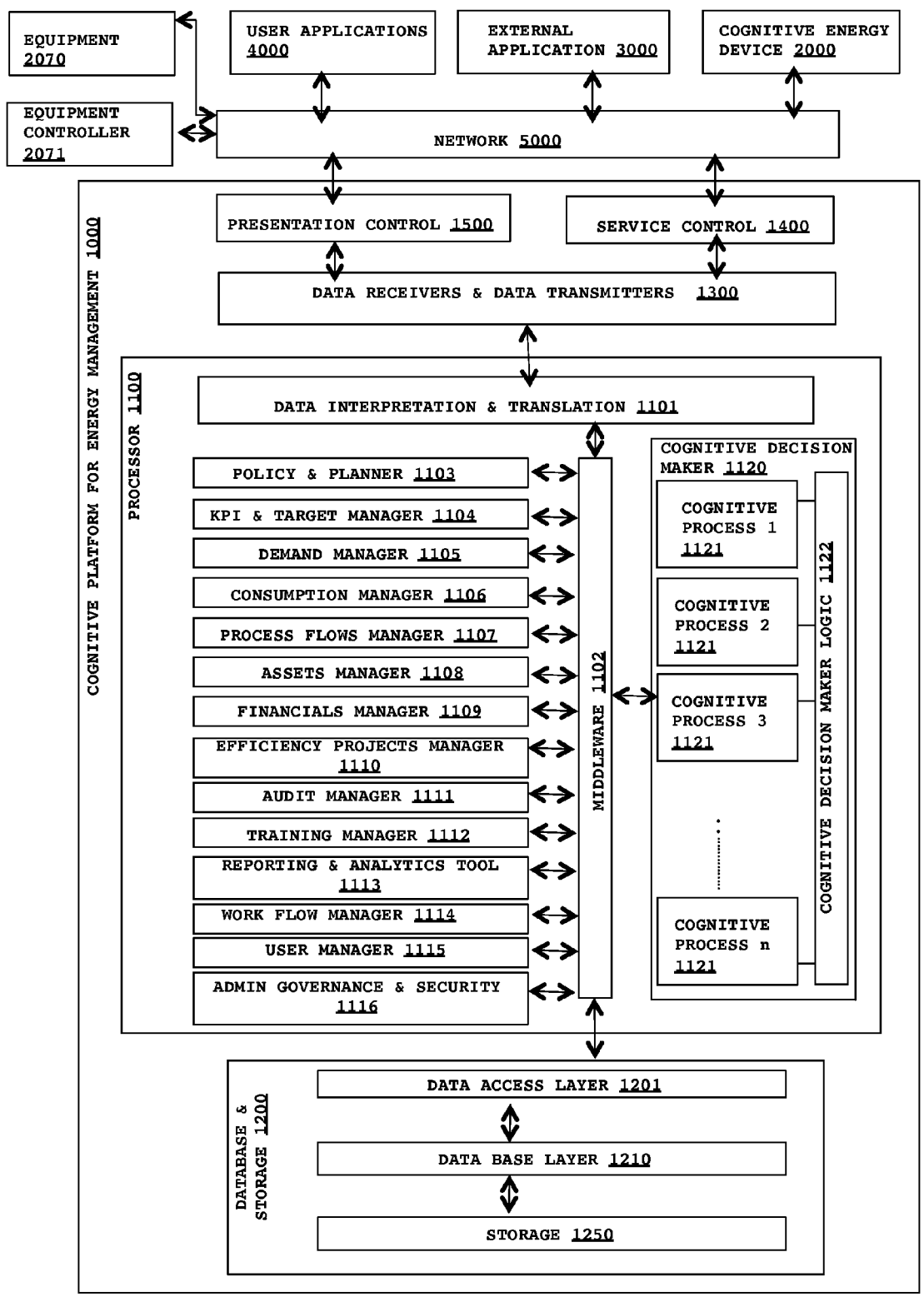
FIG. 1 is an exemplary embodiment of a system utilizing a cognitive platform for energy management and cognitive energy device.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, types and interrelationships of system components, and logic partitioning/integration choices are set forth in order to provide a more thorough understanding of the present disclosure. One skilled in the art will appreciate that embodiments of the disclosure may be practiced without such specific details. In other instances, control structures, gate level circuits and full software instruction sequences have not been shown in detail in order not to obscure the description of the of the concepts described herein.

Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

While for the purpose of simplicity, the methodologies are shown and described as a series of acts, it is to be understood and appreciated that the methodologies are not limited by the order of acts, as some acts may occur in different orders or concurrently with other acts from the shown and described herein. For example, those skilled in the art will understand and appreciate that a methodology could alternatively be represented as a series of interrelated states or events, such as in a state diagram. Moreover, not all illustrated acts maybe required to implement a methodology as described herein.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

As described herein, the exemplary embodiments of the invention are applicable to a system, method, platform and device for use for energy management. While various industry terms and acronyms are used, several terms have the following additional meanings as described.

Example of cognition includes processes by which the sensory input and/or information is transformed, reduced, elaborated, stored, recovered, used for calculating, reasoning, problem solving, decision making, applying knowledge and/or changing preferences.

Example of a platform includes a system that provides base for additional endeavors. For example, a platform can allow a variety of technologies to merge, allowing for energy management.

Example of a cognitive platform includes any platform that uses cognition or machine learning.

Example of a cognitive process includes any process that uses cognition.

Examples of energy sources include electricity, any raw material or fuel that is in solid, liquid, gaseous or plasma state. Example of energy sources also include bi-products, intermediate products generated pre, during or post manufacturing process or during intermediate manufacturing process.

Example of equipment includes any equipment or resource that consumes energy.

Example of equipment controllers includes any hardware, and/or hardware with software controls equipment, receives and/or sends energy and environmental parameters related to the equipment.

Example of a cognitive device includes any device that uses cognition. Example of a cognitive device can be a smart meter, hardware, and/or hardware with software that uses cognition.

Example of a network includes wireless and wire-line telecommunication networks, data networks, computer networks, public or private cloud, local area networks, wide area networks, Internet, content centric networks, internet of things or a heterogeneous network, for example that can have different telecommunication standards like GSM, CDMA, different versions of same telecommunication standards like GSM 900, GSM 1900, different operating systems like Unix, Android, iOS, Windows, or different versions of the same operating system like 2.1, 3.4 or different server hardware like IBM, Lenovo, HP, Oracle, different databases like relational databases, network databases, flat files, object oriented databases, NoSQL databases.

Internet can be any combination of switches, routers, hubs, microwave devices and other communication equipment that can transfer Internet protocol messages from one point to another.

Example of a cloud can be any combination of computers connected through a network.

Example of an external application includes any software application or firmware applications, programs, functions, modules, routines, processes, procedures, plug-ins, application programming interface (API), applets, widgets, code fragments and/or other tool that is connected with the cognitive platform for energy management either directly or via any interface or via any other software application. External application may run on same or different operating systems, same or different versions of the same operating system, same or different hardware, and same or different database.

Example of a user application includes any software application or firmware applications, programs, functions, modules, routines, processes, procedures, plug-ins, application programming interface (API), applets, widgets, code fragments and/or other tool that is used by people and it is connected with the cognitive platform for energy management either directly or via any interface or via any other software application. User application may run on same or different operating systems, same or different versions of the same operating system, same or different hardware, and same or different database.

According to the present invention there is provided a cognitive platform for energy management that resides at a centralized location, accessible from any location via a network or any other means now known or later devised. In this exemplary system, enterprises can manage various aspects of energy efficiently.

FIG. 1 is block diagram of an exemplary embodiment of a system utilizing a cognitive platform for energy management and cognitive energy device. As seen in FIG. 1, users via user applications 4000, external applications 3000, cognitive energy devices 2000 connect to cognitive platform for energy management 1000 via network 5000. Energy consuming equipment 2270 and/or equipment controllers 2271 connects to the cognitive energy device 2000 via network 5000. Presentation control 1500 controls the interaction between cognitive platform for energy management 1000 and user applications 4000. Service control 1400 controls the interaction between cognitive platform for energy management 1000 and external applications 3000 and cognitive energy device 2000. Data is transmitted between user applications, external applications and cognitive energy device and cognitive platform for energy management 1000 using data receivers and data transmitters 1300.

Data received is interpreted and translated for processing by the processor 1100 using data interpretation & translation 1101 and data sent to user applications 4000, external applications 3000 and cognitive energy devices 2000 is interpreted and translated using data interpretation & translation 1101. Cognitive decision maker 1120 and various applications 1103 to 1116 process the data for energy management.

Decisions made by the cognitive decision maker are communicated to the users via user applications 4000, external applications 3000 and cognitive energy device 2000. Information processed and output generated by the applications 1103 to 1116 are communicated to the users via user applications 4000, external applications 3000 and cognitive energy device 2000. Middleware 1102 acts as a bridge between various applications 1103 to 1116, cognitive decision maker 1120 and data interpretation & translation 1101. Processed data is stored in database & storage 1200.

In this exemplary embodiment, the architecture is conceptualized for integration with the existing infrastructure. By adding additional functionality to the existing infrastructure, the energy utilization within a particular facility, plant, area, organization etc., can be optimized. A combination of cooperative energy saving strategies and cognition enables a reduction in overall energy consumption through the optimal use of energy resources.

In the exemplary embodiment, the cognitive platform for energy management 1000 can be placed physically at a particular facility, plant, geographical area, or organization or as cloud based Software as a Service (SaaS) or in any other manner. Multiple cognitive platforms for energy management 1000 can be deployed in a hierarchical, or distributed manner with one or more cognitive platforms for energy management 1000 acting as a control node for other cognitive platforms for energy management 1000 or each cognitive platform for energy management acting as a control node for one or more other nodes while itself acting as a subordinate to another cognitive platform for energy management 1000. One or more cognitive platforms for energy management 1000 may be connected via a network.

Furthermore, deployment architecture related control and dimensioning requirements are also considered for achieving large-scale business needs of enterprises for energy management.

In the exemplary embodiment, a number of applications 1103 to 1116 facilitate in energy management of the enterprise. Structure of the applications 1103 to 1116 allows definitions and consolidated views, dashboards, drill-downs for easy administration and management at enterprise, department, plant, office, facilities, floor, equipment and asset level within and across enterprises.

Policy & Planner 1103 allows users to define the policies, plans at various hierarchical levels within the organization.

KPI & Target Manager 1104 allows users to define periodical key performance indicators and targets for energy consumption and demand at various hierarchical levels within the organization.

Demand Manager 1105 allows users to manage the sourcing of energy and raw material procurement, vendors based on business plans, policies, and requirements.

Consumption Manager 1106 allows users to manage the consumption of energy and raw material procurement, vendors based on actual consumption information as well as plans and policies.

Process Flows Manager 1107 allows for users to manage energy inflows and outflows for energy balance within and across energy consuming equipment. Such inflows and outflows and associated wastages can help in identifying energy losses and facilitate energy efficiency improvement plans and programs.

Assets Manager 1108 allows for users to manage knowledge, information and data related to all energy consuming assets.

Financials Manager 1109 allows for users to manage knowledge, information and data related to energy financial data. Such data can include cost of energy, tariff calculations, cost of raw material, procurement costs, and any other information that impacts the financial aspects of energy consumption or demand.

Efficiency Projects Manager 1110 allows for users to manage knowledge, information and data related to all efficiency improvement projects undertaken by the enterprise. Such projects can range from simple maintenance activities of equipment to major changes to the plant and machinery. Such projects may run for a very short duration (for example a few minutes to few days) or for a very long duration (say few months to several years). Efficiency Projects Manager 1110 allows for systematic management of all such projects.

Audit Manager 1111 allows for internal and external audits related to energy management. Users can simulate, emulate, estimate the energy consumption and demand using data collected during the audit and identify any improvement areas, problem areas, compliances and non-compliances.

Training Manager 1112 allows human experts construct the initial knowledge for use by cognitive decision maker 1120. Users can simulate, emulate, estimate, conduct scenario analysis and define goals, tasks, rules, operations, constraints, ends, steps, and algorithms to achieve the goals, tasks. Training Manager 1112 also allows for defining preferences, priorities and precedence in case of multiple options for a given goal or task, especially for situations where multi-objective constraint optimization is needed. Training Manager 1112 allows for the enterprise, departments, plants, offices, facilities, floors, and equipment level training.

Reporting & Analytics Tool 1113 allows users and other applications to generate reports and reports based on analysis. Reporting & Analytics Tool 1113 allows for the enterprise, departments, plants, offices, facilities, floors, and equipment level reporting.

Work Flow Manager 1114 allows for collaboration between individuals and intra and inter organizational process flows to be managed for effective energy management.

User Manager 1115 allows for management of all users of cognitive platform for energy management 1000 based on roles, access rights of the users.

Admin Governance & Security 1116 manages all security, administration and governance aspects of the cognitive platform for energy management 1000. Admin Governance & Security 1116 can maintain audit trial of every action undertaken by users.

Figure 2:
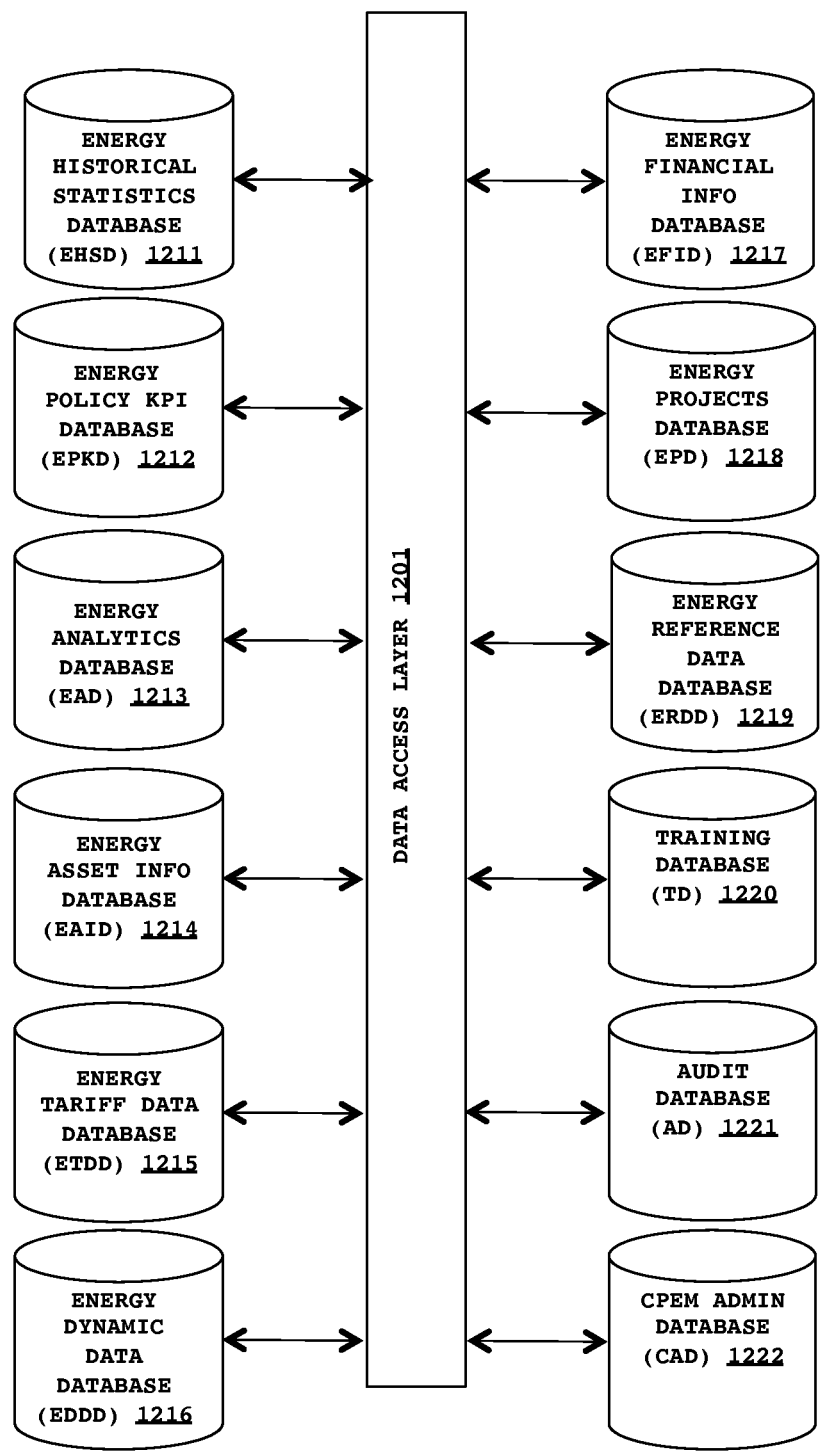
FIG. 2 is an exemplary embodiment of databases of cognitive platform for energy management.

Cognitive Decision Maker 1120, Cognitive Process 1121 and Cognitive Decision Maker Logic 1122 are explained in detail after describing FIG. 2 for easy understanding.

FIG. 2 is an exemplary embodiment of databases of cognitive platform for energy management. As seen in FIG. 2, various databases 1211 to 1222 form part of the cognitive platform for energy management 1000. Energy historical statistics database (EHSD) 1211 is a knowledge repository that stores knowledge and information related to all historical statistics. EHSD 1211 stores knowledge, information and data related rules, skills, data and processes that impact the energy management and future decision making. Data collected by the cognitive energy devices 2000 is subject to constant changes. Therefore, end-to-end computations are based not solely on current available operational states, but also on associated statistics computed and measured over long time periods, for the particular equipment, facility and/or environment. Historical statistical data recorded in the EHSD 1211 enables the decision maker algorithms to learn from experience and to more accurately predict future changes. EHSD 1211 can be seen as time dependent database that lists the probabilities of different scenarios available for different assets/equipment at a particular time moments. In addition to the data collected from all cognitive energy devices 2000, EHSD 1211 also stores and links information from social media, internet databases and other external data sources to get information related to energy and environmental parameters, user behaviors, opinions, preferences and other relevant data or information. By increasing the number of sources and by increasing the accuracy of identification of energy usage in a particular situation, a more correct cognitive decision prediction is possible.

EHSD 1211 stores all information related to active awareness of the equipment information and passive awareness of the surrounding environment (structured and unstructured data sourced from own or third parties by the enterprise) and associated relationship between the various data.

Energy policy KPI database (EPKD) 1212 is a knowledge repository that stores knowledge, information and data related to enterprise policies, planning, and key performance indicators for energy management. Energy analytics database (EAD) 1213 is a knowledge repository that stores knowledge, information and data related to various analytics related to energy management that can be used for reporting purpose. Energy assets database (EAD) 1214 is a knowledge repository that stores knowledge, information, and data related to enterprise energy assets. Energy tariff data (ETD) 1215 is a knowledge repository that stores knowledge, information and data related to costs, quantities and other associated information that impacts the cost of energy in an enterprise. Energy dynamic data database (EDDD) 1216 is a knowledge repository that stores knowledge, information and data related to periodical energy usage and consumption information for all energy assets and all other dynamic data is received from cognitive energy device 2000, external applications 3000 and user applications 4000. Energy financial info database (EFID) 1217 is a knowledge repository that stores knowledge, information and data related financial information like production data, production planning and scheduling data that impacts energy consumption and demand. Energy projects database (EPD) 1218 is a knowledge repository that stores knowledge, information and data related all energy saving projects undertaken or planned by the enterprise. Energy reference data database (ERDD) 1219 is a knowledge repository that stores knowledge; information and data related to system and enterprise that impacts cognitive platform for energy management 1000. ERDD 1219 also stores knowledge, information and data related to energy process flows within the enterprise. Training database (TD) 1220 is a knowledge repository that stores knowledge, information and data related to training of various uses of the cognitive platform for energy management 1000 and cognitive energy device 2000. Audit database (AD) 1221 is a knowledge repository that stores knowledge, information and data related to internal and external energy audits conducted by the enterprise.

CPEM admin database (CAD) 1222 is a knowledge repository that stores knowledge, information and data related to administration, governance, security, workflows and users.

Various databases 1211 to 1222 in the exemplary embodiment can be on same or different operating systems like Unix, Android, iOS, Windows; same or different versions of the same operating system like 2.1, 3.4; or same or different server hardware like IBM, Lenevo, HP, Oracle; or same or different databases like relational databases, network databases, flat files, object oriented databases, NoSQL databases. One or more of the databases 1211 to 1222 can be combined into a single database. One or more databases 1211 to 1222 can be on a network. Databases 1211 to 1222 can be deployed in single tier or multiple tiers with or without redundancy, availability, fail-safe options with single or multi phase commits.

Cognitive decision maker 1120 has ability to improve performance through learning. Artificial intelligence techniques enable such changed behavior. It uses cognitive process 1121 that perceives and acts. Architecture and configuration of cognitive process 1121 depends on the business requirements. Cognitive process 1121 for simple aware application requirement maps percepts to actions. Cognitive process 1121 for an adaptive application includes a state memory and achieves more sophisticated behavior. Cognitive process 1121 for goal-based analysis has a model of the environment and equipment and can estimate the results of alternatives. Cognitive process 1121 supports learning with feedback, artificial neural networks, metaheuristic algorithms, hidden Markov model, rule based systems, ontology-based and case based systems.

Goal information identifies states that are desirable. It also maintains steps required to reach the goal. Steps can be a single step to reach the goal or a sequence of steps to reach the goal. Cognitive process 1121 may also maintain feedback information. Cognitive decision maker 1120 uses knowledge, data, and information stored in database & storage 1200.

Cognitive process 1121 can include a variety of artificial intelligence techniques to realize the capability. Standard searching solutions like breadth-first search, depth limited search, iterative deepening depth first algorithms can yield different performance, time or space complexity as a function of environment. Genetic algorithms can be used to explore the action space in a controlled manner. Neural engineering techniques can be used to explore the possible relationships between percepts and actions. Neural network is initially trained by providing a set of known inputs and desired outputs based on information available in the databases EAID 1214 and ERDD 1219.

The neural network, to learn the desired behaviors, uses these observations. Feedback provided by the desired output is used for learning using various techniques like inductive learning, ensemble learning. Any fielded cognitive process will have an initial set of knowledge based on EAID 1214 and ERDD 1219. Statistical models of learning include Bayesian computations of probability as a function of percepts, self-organizing maps such as Kohonen networks, Back propagation neural networks or any other model. A feedback mechanism determines when the candidate rules are allowed to survive or if they are to be removed. Cognitive process can use the initial knowledge system constructed by the human expert using training manager 1112. Cognitive process 1121 takes decision on how to achieve a goal by taking specific objectives and constraints into consideration. There can be multiple cognitive processes running simultaneously on various precepts at a given point in time.

Cognitive process 1121 obtains data related to goals, plans, rules, operations constraints, ends from EHSD 1211 and current state from relevant data source. For example current state for energy consumption data can be from EDDD 1216, energy demand data, baseline information can be from any one or more of EAD 1213, EAID 1214, ERDD 1219, and EFID 1217, KPIs can be from EPKD 1212. Cognitive process 1121 also obtains knowledge and information related to problem solving methods that impact cognitive function, specialized skills like perceptive, reactive, action recognition and rule based action executing from EHSD 1211, algorithmic optimization inputs from EHSD 1211. Cognitive process 1121 applies the knowledge on the data and information and arrives at the possible options to achieve the goal with weights for each possible option.

Cognitive decision maker logic 1122 supports multi-objective constraint optimization based on multiple cognitive processes 1121 thus ensuring the optimal solution taking all goals, objectives and constraints into consideration.

Figure 3:
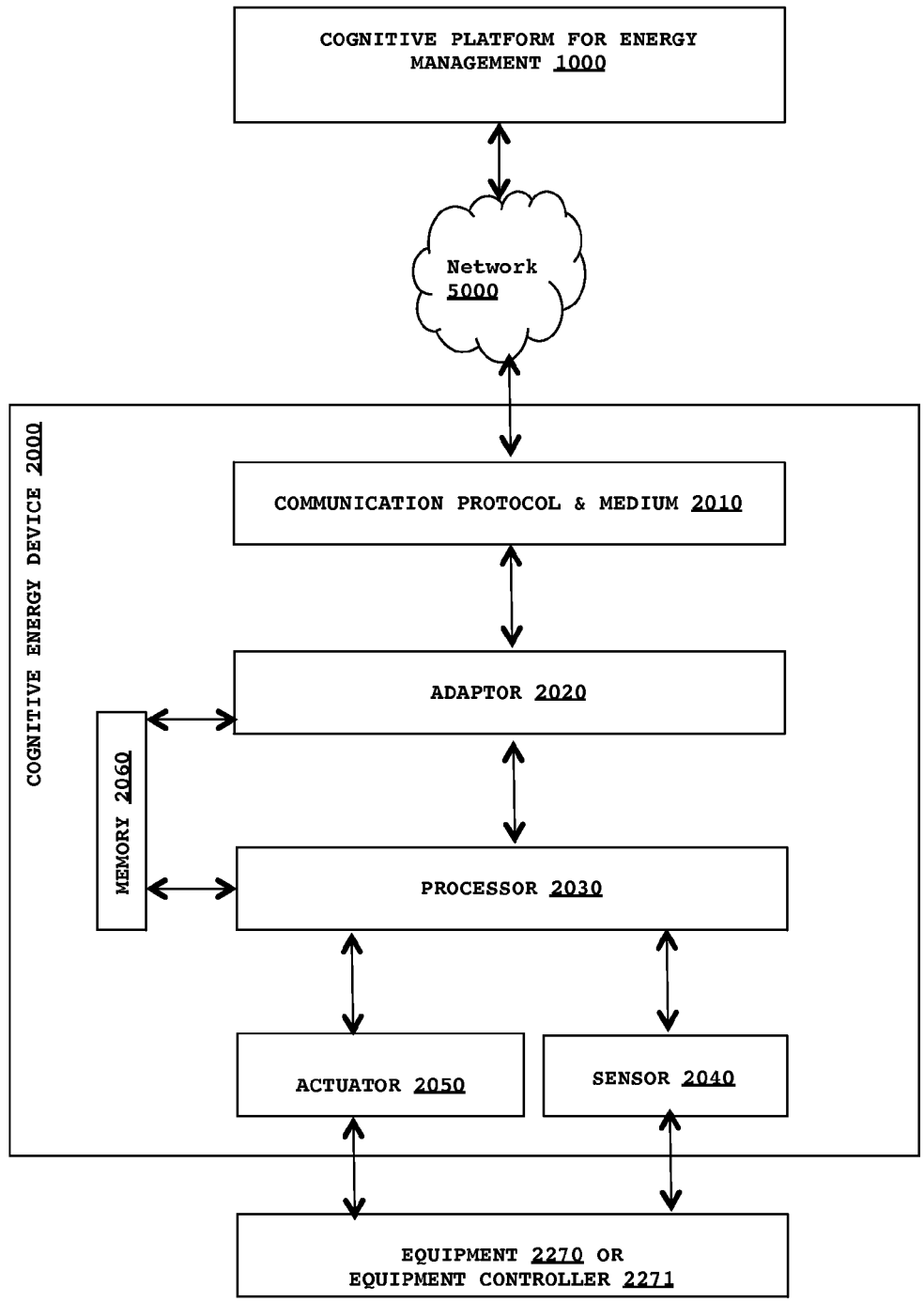
FIG. 3 is an exemplary embodiment of a system utilizing a cognitive energy device.

FIG. 3 is an exemplary embodiment of a system utilizing a cognitive energy device. As seen in FIG. 3, cognitive energy device 2000 is connected to cognitive platform for energy management 1000 via network 5000. Energy consuming equipment 2270 or equipment controller 2271 of energy consuming equipment 2270 is connected with the cognitive energy device 2000. Sensor 2040 of the cognitive energy device 2000 senses the equipment's energy consumption and other parameters and communicates the sensed information to the processor 2030. Memory 2060 of the cognitive energy device 2000 contains information related to the equipment energy consumption and control information. Adaptor 2020 contains specific skill, process, knowledge, and information relevant to the equipment 2270 or equipment controller 2271 that the cognitive energy device 1000 is controlling. Processor 2030 determines whether any instructions should be given to the equipment 2270 or equipment controller 2271 which in turn can control the equipment 2270 and communicates those instructions via actuator 2050.

Sensed information is also transmitted to cognitive platform for energy management 1000 via the network 5000. Communication protocol & medium 2010 handles specific message types formatted to handle all necessary data exchange with the cognitive platform for energy management 1000. The cognitive platform for energy management 1000 can also communicate a decision to the cognitive energy device 2000 to implement changes to the equipment settings or equipment controller and cognitive energy device executes such instructions using actuator 2050.

In the exemplary embodiment, cognitive devices are intelligent devices that can be programmed and configured dynamically. Different parameters can be configured on the fly, in near real-time depending on the environment and avoiding bottlenecks. Cognitive energy device is a cognitive device. It is software controlled and has reconfigurable interface where the physical layer (hardware) behavior can be significantly changed as a consequence of changes in the software i.e., the same hardware entity can perform different functions at different times. The main advantage of this software controlled cognitive energy device are in terms of multi-functionality e.g., compactness, power efficiency, ease of upgrading and ability to handle multiple standards.

Figure 4:
FIG. 4 is a block diagram of an exemplary embodiment of cognitive energy device connected to energy consuming equipment via equipment controller.

FIG. 4 is a block diagram of an exemplary embodiment of cognitive energy device 2000 connected to energy consuming equipment 2270 via equipment controller 2271. Equipment controller 2271 receives relevant information from equipment 2270 and communicates the same to cognitive energy device 2000. Equipment controller 2271 also receives instructions from cognitive energy device 2000 and executes the same onto equipment 2270.

Figure 5:
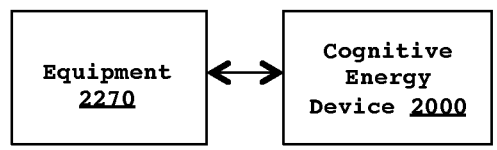
FIG. 5 is a block diagram of another exemplary embodiment of cognitive energy device connected to energy consuming equipment.

FIG. 5 is a block diagram of another exemplary embodiment of cognitive energy device 2000 connected to energy consuming equipment 2270 directly. Cognitive energy device 2000 receives relevant information related to energy consumption from the equipment 2270. Cognitive energy device 2000 sends instructions to equipment 2270 as appropriate.

Figure 6:
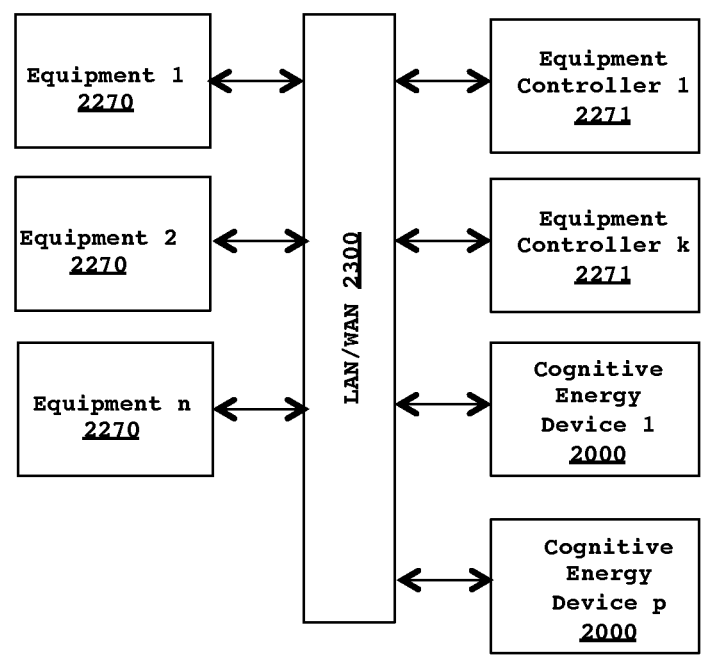
FIG. 6 is a block diagram of another exemplary embodiment of cognitive energy device connected to energy consuming equipment and equipment controller via a network.

FIG. 6 is a block diagram of another exemplary embodiment of cognitive energy device 2000 connected to energy consuming equipment 2270 and equipment controller 2271 via a network 5000. Cognitive energy device receives information and sends instructions to equipment 2270 and equipment controller 2271 as appropriate.

Figure 7:
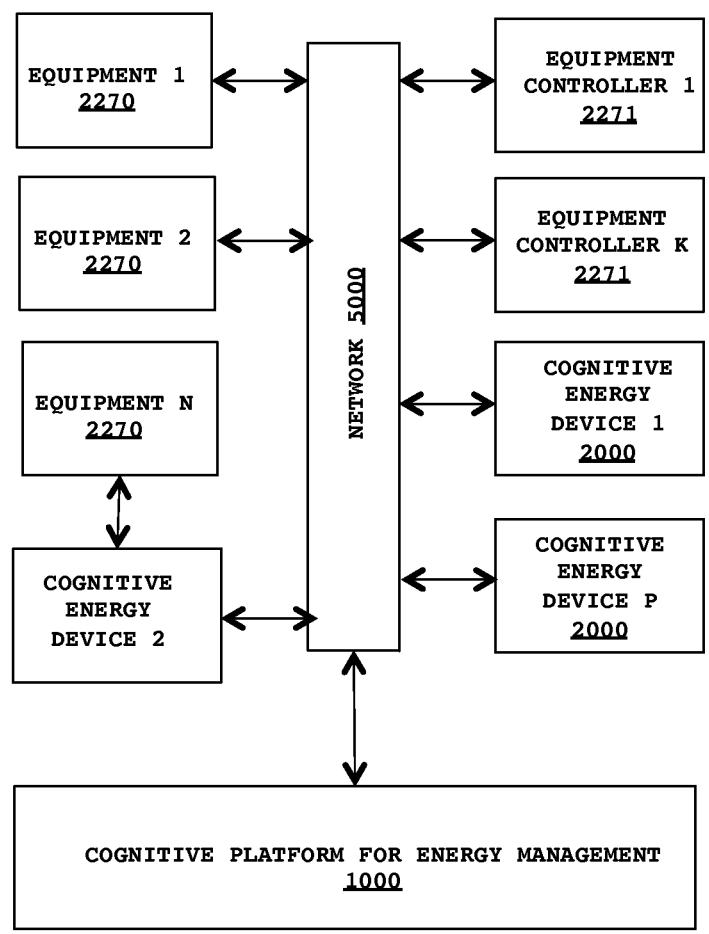
FIG. 7 is an exemplary embodiment of a system utilizing a cognitive energy device and cognitive platform for energy management.

FIG. 7 is an exemplary embodiment of a system utilizing a cognitive energy device and cognitive platform for energy management. As seen in FIG. 7, cognitive energy device 2000 is connected to energy consuming equipment 2270, equipment controller 2271 and cognitive platform for energy management 1000 via a network 5000. Cognitive energy device receives information and sends instructions to equipment and equipment controller as appropriate. Cognitive platform for energy management 1000 receives and sends information from/to cognitive energy device 2000 and thus controls the energy consuming equipment 2270 over network 5000.

Figure 8:
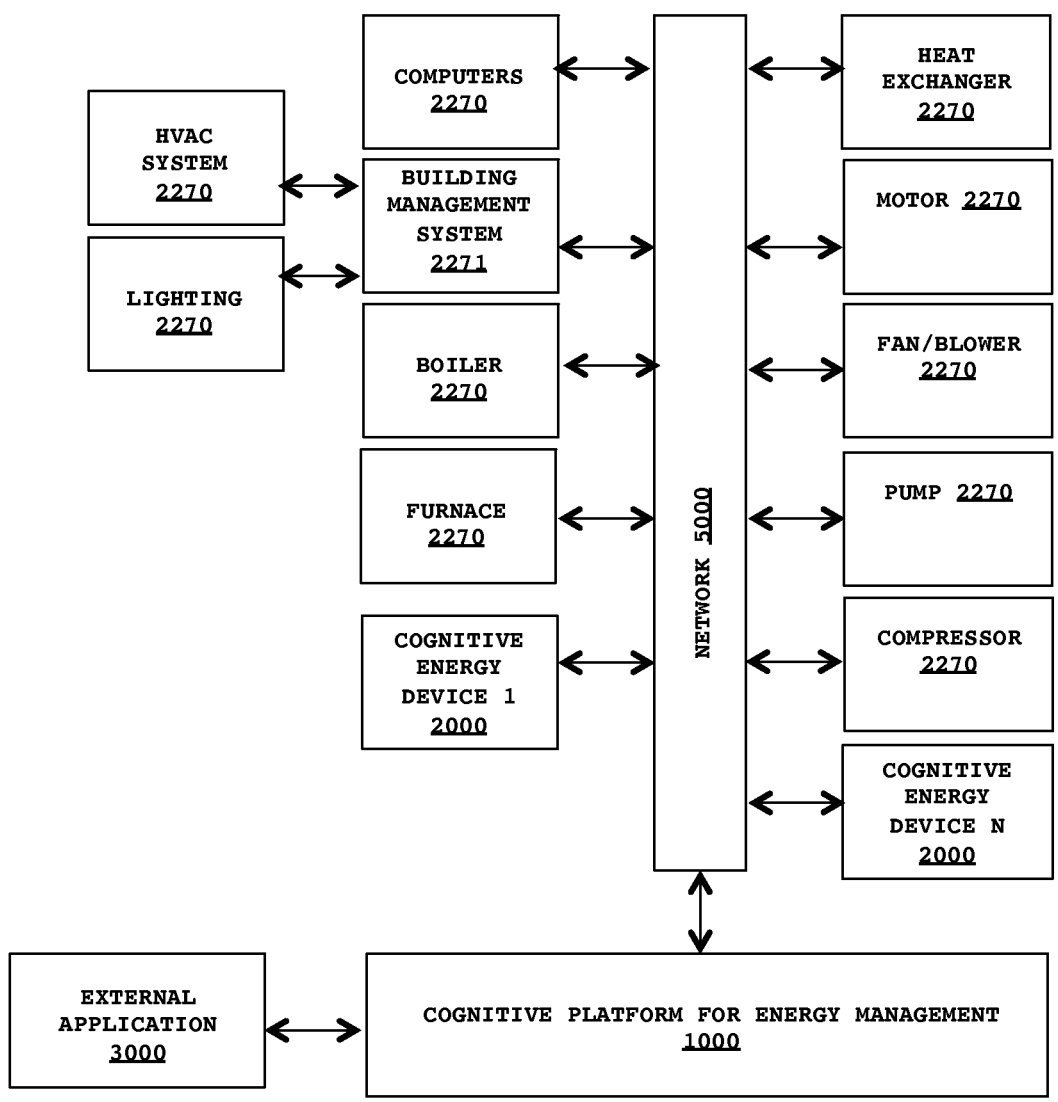
FIG. 8 is an exemplary embodiment of a system utilizing a cognitive energy device and cognitive platform for energy management.

FIG. 8 is an exemplary embodiment of a system utilizing a cognitive energy device and cognitive platform for energy management. As seen in FIG. 8, cognitive energy device 2000 is connected to energy consuming equipment 2270, equipment controller 2271 and cognitive platform for energy management 1000 via a network 5000. External applications 3000 are connected to the cognitive platform for energy management. Various exemplary energy consuming equipment 2270 indicated include computers, boiler, furnace, heat exchanger, motor, fan/blower, pump, compressor. HVAC system and lighting are connected to the equipment controller building management system 2271. Cognitive energy device receives information and sends instructions to equipment and equipment controller as appropriate. Cognitive platform for energy management 1000 receives and sends information from/to cognitive energy device 2000 and thus controls the energy consuming equipment 2270 over network 5000. If any of the equipment 2270 or equipment controllers 2271 can not be connected to the network, the relevant input information for the cognitive platform for energy management 1000 can be manually captured and data can be manually inputted by the users and similarly the relevant output information from the cognitive platform for energy management 1000 can be used by the users for manually adjusting the relevant equipment 2270 or equipment controllers 2271.

Figure 9:
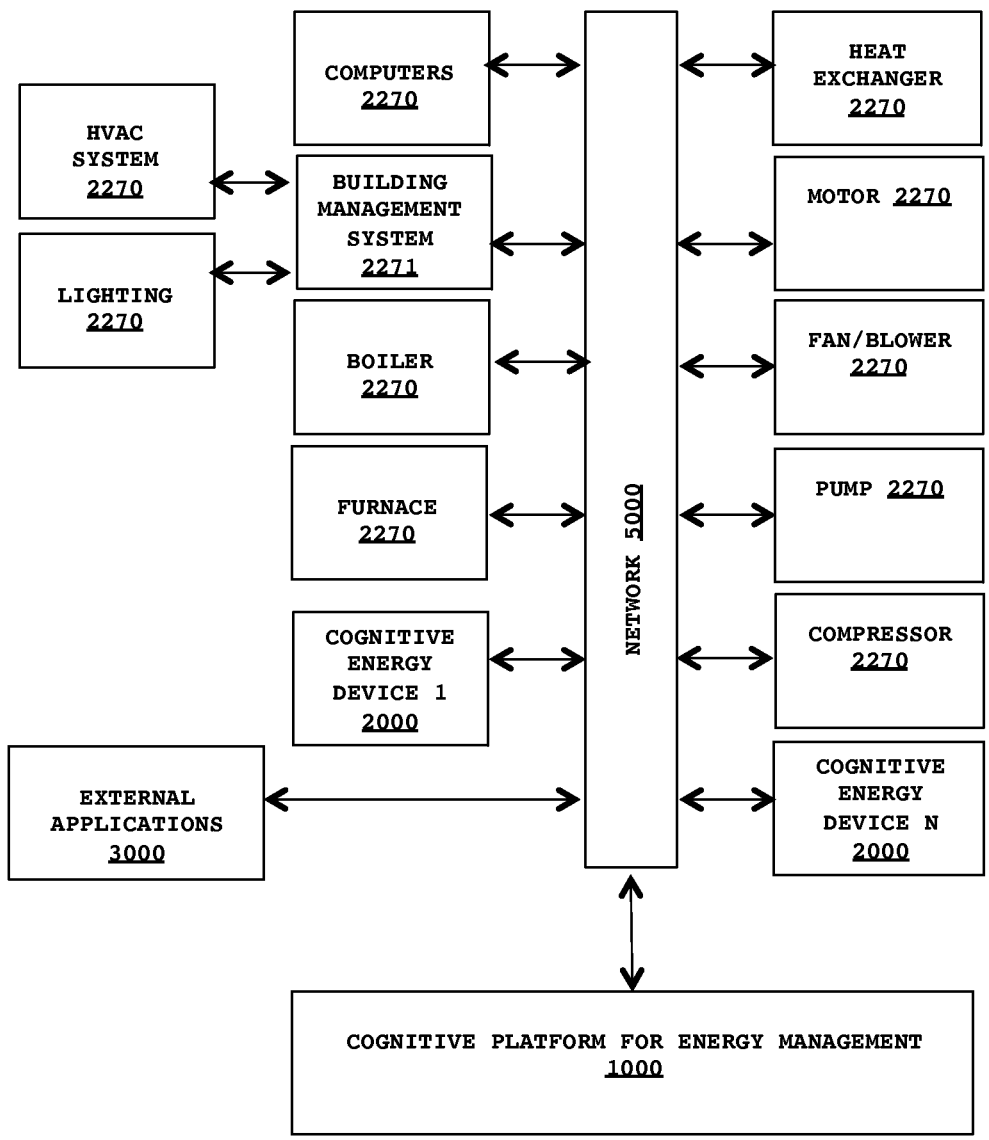
FIG. 9 is an exemplary embodiment of a system utilizing a cognitive energy device and cognitive platform for energy management.

FIG. 9 is an exemplary embodiment of a system utilizing a cognitive energy device and cognitive platform for energy management. As seen in FIG. 9, cognitive energy device 2000 is connected to energy consuming equipment 2270, equipment controller 2271, external applications 3000 and cognitive platform for energy management 1000 via a network 5000. Various exemplary energy consuming equipment 2270 indicated include computer, communication equipment, boiler, furnace, heat exchanger, motor, fan/blower, pump, compressor. HVAC system and lighting are connected to the equipment controller building management system 2271. Cognitive energy device receives information and sends instructions to equipment and equipment controller as appropriate. External applications 3000 are connected to the cognitive platform via network 5000 for energy management. Cognitive platform for energy management 1000 receives and sends information from/to cognitive energy device 2000 and thus controls the energy consuming equipment 2270 over network 5000. If any of the equipment 2270 or equipment controllers 2271 can not be connected to the network, the relevant input information for the cognitive platform for energy management 1000 can be manually captured and data can be manually inputted by the users and similarly the relevant output information from the cognitive platform for energy management 1000 can be used by the users for manually adjusting the relevant equipment 2270 or equipment controllers 2271.

Figure 10:
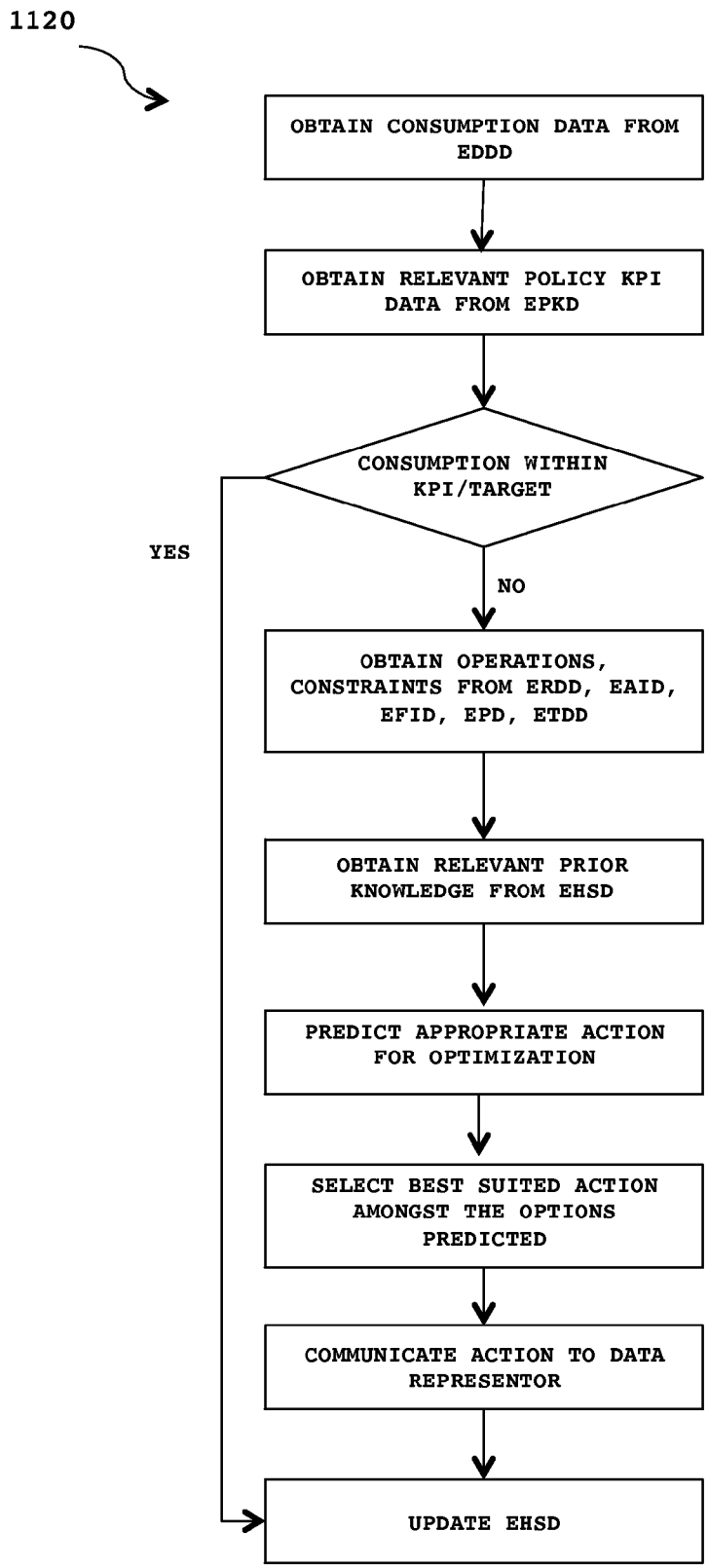
FIG. 10 is an exemplary embodiment of a flow chart showing steps associated with cognitive decision maker for optimization of energy consumption.

FIG. 10 is an exemplary embodiment of a flow chart illustrating an example step(s) associated with cognitive decision maker 1120 for optimization of energy consumption. While, for the purposes of simplicity of explanation, the methodology is shown and described as a series of acts, it is to be understood and appreciated that the methodologies are not limited by the order of acts, as some acts may occur in different orders or concurrently with other acts from the shown and described herein. For example, those skilled in the art will understand and appreciate that a methodology could alternatively be represented as a series of interrelated states or events, such as in a state diagram. Moreover, not all illustrated acts maybe required to implement a methodology as described herein.

As seen in FIG. 10, cognitive decision maker 1120 obtains consumption data from EDDD 1216. Cognitive decision maker 1120 then obtains the relevant data like key performance indicators (KPI), and targets from EPKD 1212. Cognitive decision maker 1120, then compares whether the consumption data is within the KPI or target. If the consumption is within the KPI or target, cognitive decision maker updates the EHSD 1211 with relevant information. If consumption is not within the KPI or target, then cognitive decision maker 1120 obtains information related to specialized knowledge related to operations and associated constraints from various other data bases. For example, cognitive decision maker 1120 obtains information related to the specific energy consuming equipment from EAID 1214. Such information can include standard energy consumption norms defined by the vendor of the equipment, specific operating conditions like operating temperature, humidity, and other information that may impact energy consumption. Cognitive decision maker 1120 obtains financial information related energy consuming equipment from EFID 1212, information related to specific energy projects undertaken by the enterprise from EPD 1218 for the specific equipment or facility, and tariff related information from ETDD 1215. Cognitive decision maker 1120, then analyzes current scenario against prior knowledge and predicts appropriate action for energy consumption optimization. The cognitive decision maker 1120 predicts one or more appropriate actions and options for actions. If more than option exists for optimization, cognitive decision maker 1120, then decides which one of those options is best suited for the given scenario based on criteria like weightage score, algorithms, customer preferences as defined in ERDD 1219 and CAD 1222. Cognitive decision maker 1120, then communicates the best suited option to data interpretation & translation 1101 for further processing and communicating the changed settings or new settings to the equipment 2070 and/or equipment controller 2071. Cognitive decision maker 1120 also updates the EHSD 1211.

Figure 11:
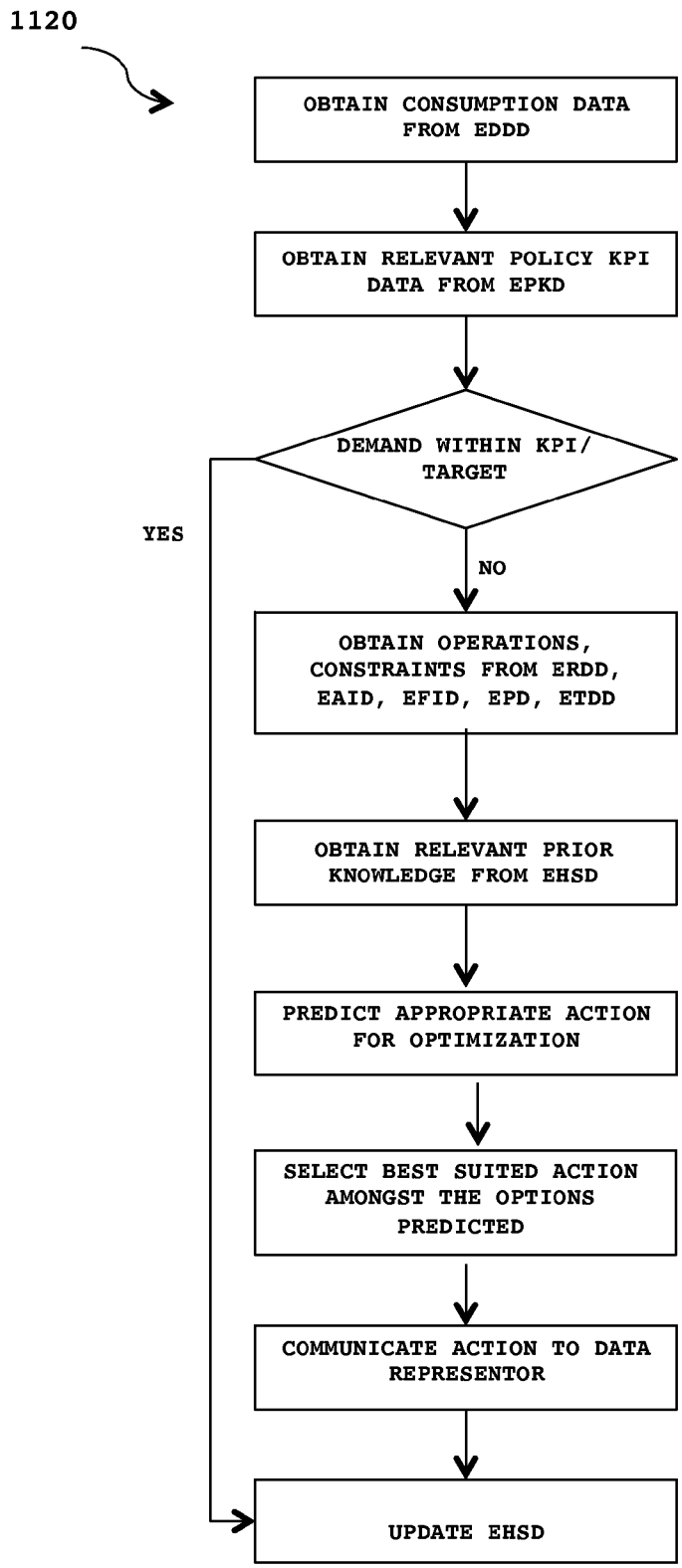
FIG. 11 is an exemplary embodiment of a flow chart showing steps associated with cognitive decision maker for optimization of energy demand.

FIG. 11 is an exemplary embodiment of a flow chart illustrating an example step(s) associated with cognitive decision maker 1120 for optimization of energy demand. As seen in FIG. 11, cognitive decision maker 1120 obtains energy demand data from EAD 1213. Cognitive decision maker 1120 obtains the relevant data like key performance indicators (KPI) and targets from EPKD 1212. Cognitive decision maker 1120, compares whether the energy demand is within the KPI or target. If the demand is within the KPI or target, cognitive decision maker updates the EHSD 1211 with relevant information. If demand is not within the KPI or target, then cognitive decision maker 1120 obtains information related to specialized knowledge related to operations and associated constraints from various other data bases. For example, cognitive decision maker 1120 obtains information related to the specific energy consuming equipment from EAID 1214. Such information can include standard energy consumption norms defined by the vendor of the equipment, specific operating conditions like operating temperature, humidity, and other information that may impact energy consumption. Cognitive decision maker 1120 obtains financial information related energy consuming equipment from EFID 1212, information related to specific energy projects undertaken by the enterprise from EPD 1218 for the specific equipment or facility, and tariff related information from ETDD 1215. Cognitive decision maker 1120 obtains the relevant prior knowledge EHSD 1211. Cognitive decision maker 1120 analyzes current scenario against prior knowledge and predicts appropriate action for energy demand optimization. The cognitive decision maker 1120 predicts one or more appropriate actions and options for actions. If more than option exists for optimization, cognitive decision maker 1120, then decides which one of those options is best suited for the given scenario based on criteria like weightage score, algorithms, customer preferences as defined in ERDD 1219 and CAD 1222. Cognitive decision maker 1120, then communicates the best suited option to data interpretation & translation 1101 for further processing and communicating the changed settings or new settings to the equipment 2070 and/or equipment controller 2071. Cognitive decision maker 1120 also updates the EHSD 1211.

Figure 12:
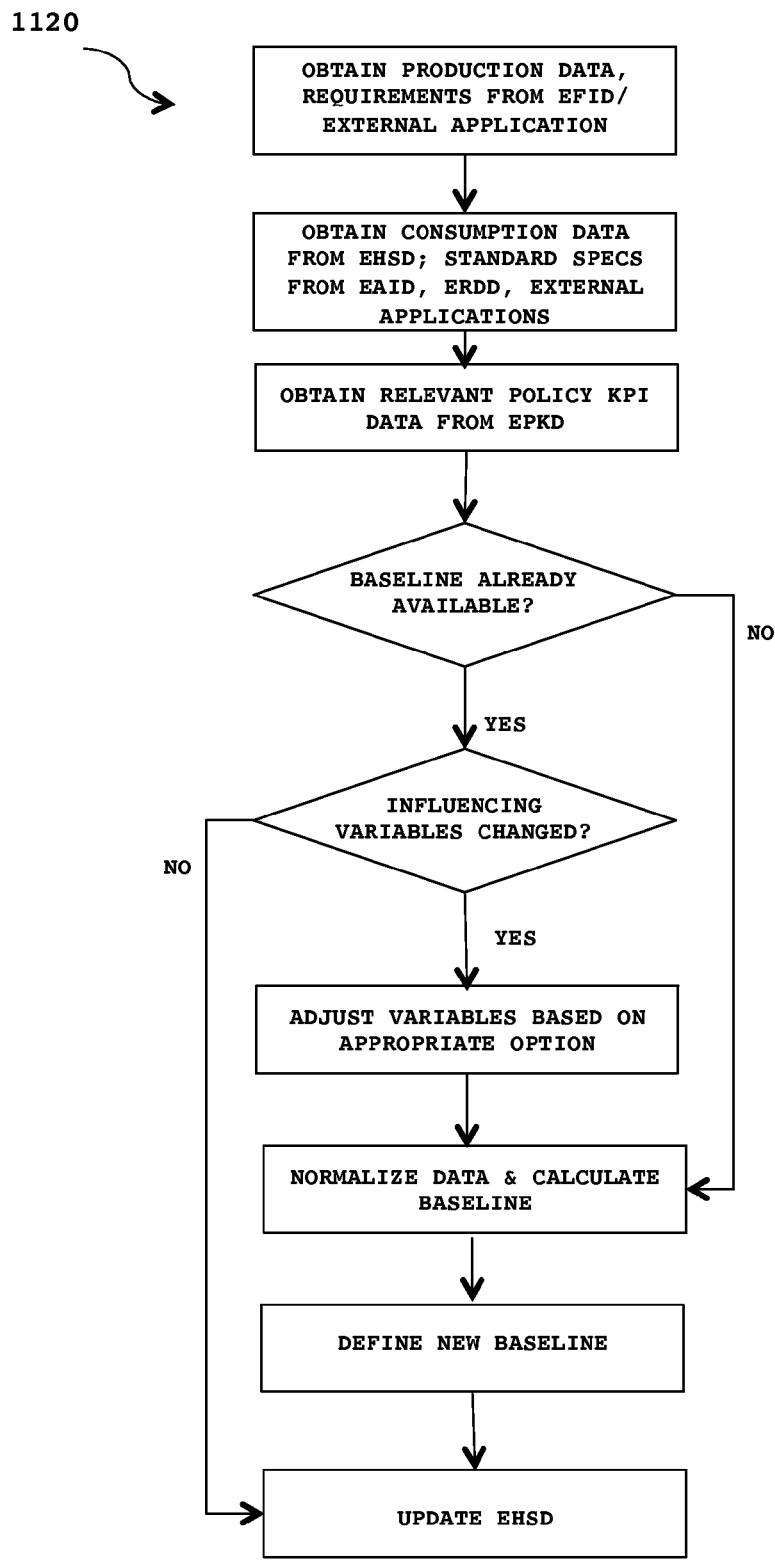
FIG. 12 is an exemplary embodiment of a flow chart showing steps associated with cognitive decision maker for dynamic baseline definition.

FIG. 12 is an exemplary embodiment of a flow chart illustrating an example step(s) associated with cognitive decision maker 1120 for dynamic baseline definition. As seen in FIG. 12, cognitive decision maker 1120 obtains production data, requirements from EFID and/or external applications for specific equipment, facility, or zone etc. Cognitive decision maker 1120 obtains historical consumption knowledge from EHSD 1211, standard specifications and energy consumption norms from EAID 1214, ERDD 1219, and external applications 3000. Cognitive decision maker 1120 also obtains information related to policies, key performance indicators (KPIs) from EPKD 1212. Cognitive decision maker 1120 then verifies whether a baseline already exists for the specific equipment, facility, or zone etc.

If the baseline is not available, then cognitive decision maker normalizes the data and calculates the baseline for the equipment, facility or zone etc. Cognitive decision maker 1120 defines the baseline for the specific equipment, facility of zone etc and updates EHSD 1211 with the relevant information.

If a baseline is already existing, cognitive decision maker verifies whether variables that influence the baseline have changed or not. If there is no change to the influencing variables, cognitive decision maker 1120 updates the EHSD 1211 with the relevant information.

If the influencing variables have changed, then cognitive decision maker 1120 identifies options for adjusting the variables, selects an option based on criteria like weightage scores, algorithms, customer preferences as defined in ERDD 1219 and CAD 1222 and then adjusts the variables based on the selected option. Cognitive decision maker 1120 updates the EHSD 1211 with the relevant information.

Figure 13:
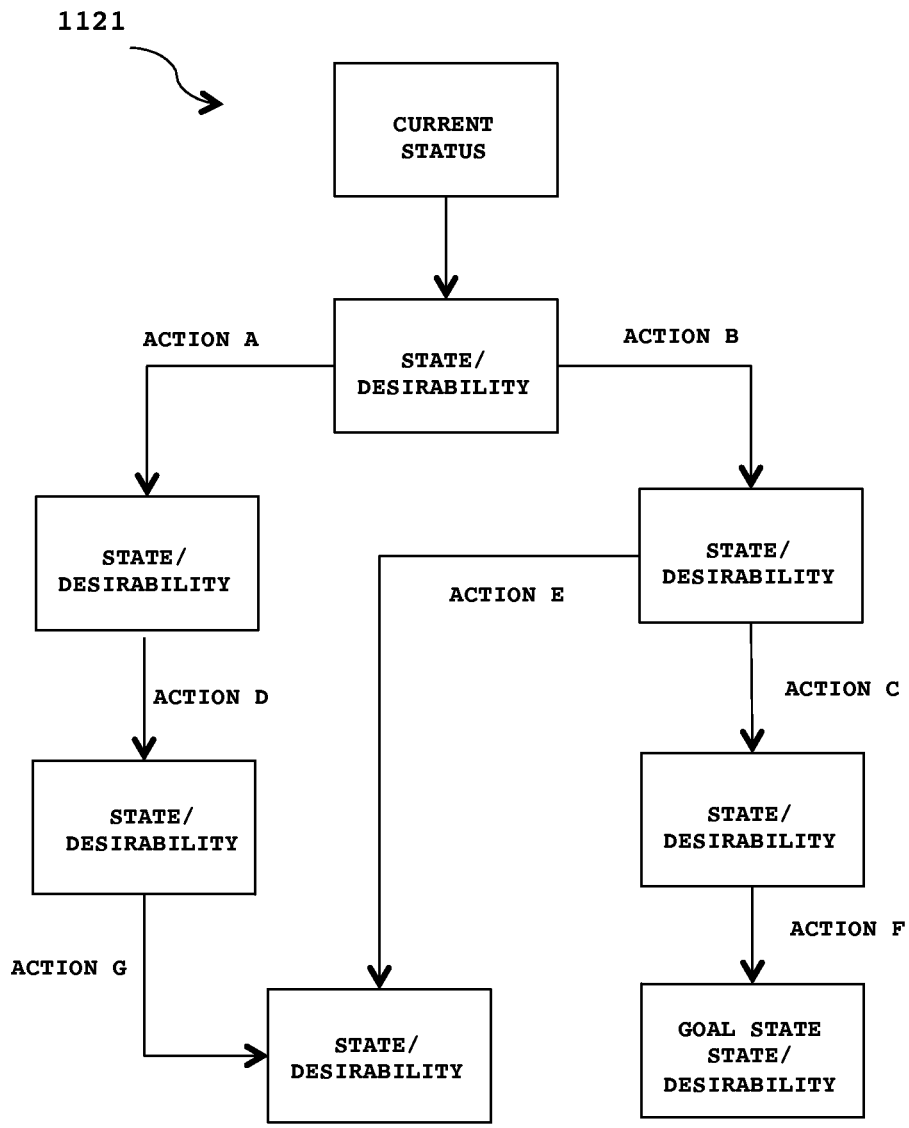
FIG. 13 is an exemplary embodiment of a flow diagram illustrating cognitive process.

FIG. 13 is an exemplary embodiment of a flow diagram illustrating cognitive process. As seen in FIG. 13, cognitive process 1121 analyses the current status, state/desirability and arrives at possible actions A and B. It executes action A and re-analyses the current status, state/desirability and arrives at possible action D. It executes action D and re-analyses the current status, state/desirability and arrives at possible action G. It executes action G and re-analyses the current status, state/desirability and arrives at conclusion that there is no possible action available from the prior-knowledge.

Cognitive process rolls back to original status, state/desirability and executes action B and re-analyses the current status, state/desirability and arrives at possible actions C and E. It executes action E and re-analyses the current status, state/desirability and arrives at conclusion that there is no possible action available from the prior-knowledge. Cognitive process rolls back and executes action C and re-analyses the current state, state/desirability and arrives at possible action F. If executes action F, re-analyses the current state, state/desirability and arrives at the conclusion that it is the goal state (desirable state). Accordingly, cognitive process 1121 concludes that actions B, C, F are the right steps to be conducted in that particular order to achieve the desired goal.

We claim:

1. A method for managing energy in an enterprise, comprising:
   a. accepting, via a cognitive platform for energy management, at least one parameter related to a current state of equipment within an enterprise and at least one parameter related to at least one desirable state of an enterprise;
   b. analyzing, via a cognitive decision maker, and identifying one or more sets of hierarchies of possible actions to reach one or more sets of hierarchies of possible desirable states of an enterprise wherein the one or more sets of hierarchies of possible desirable states of the enterprise are selected from the group consisting of a local state related to equipment and a global state related to enterprise, and choosing a possible set of actions based on the hierarchy of desirable local and global states of the enterprise;
   c. implementing the chosen set of actions, re-analyzing the current state of equipment and verifying whether it approaches the desirable local and global states of enterprise and rolling-back local desirable states of equipment if global states of enterprise are not approached;
   d. repeating steps b and c until there is at least one set of hierarchies of possible actions that can achieve the desirable state of global states of enterprise or until all possible sets of identified hierarchy of desirable local and global states of enterprise are exhausted;
   e. updating the historical statistics database with one set of parameters related to local hierarchies of possible actions that can achieve the desirable global states of enterprise.

2. A method as claimed in claim 1, wherein one or more sets of hierarchies of possible actions are based on multi-objective constraint optimization.

3. A method as claimed in claim 1, wherein said analyzing is based on any one of rule based action, algorithmic optimization, perceptive action or reactive action.

4. A method as claimed in claim 1, wherein the cognitive decision maker uses the parameters related to hierarchies of possible actions as observation to learn the desired behavior.

5. A system for managing energy in an enterprise, the system comprising:
   a. a module for accepting, via a cognitive platform for energy management, at least one parameter related to current state of equipment within an enterprise and at least one parameter related to at least one desirable state of an enterprise;
   b. a module for analyzing, via a cognitive decision maker, and identifying one or more sets of hierarchies of possible actions to reach one or more sets of hierarchies of possible desirable states of an enterprise wherein the one or more sets of hierarchies of possible desirable states of the enterprise are selected from the group consisting of a local state related to equipment and a global state related to enterprise and choosing a possible set of actions based on the hierarchy of desirable local and global states of the enterprise;
   c. a module for implementing the chosen set of actions and re-analyzing the current state of equipment and verifying whether it approaches the desirable local and global states of enterprise and rolls-back local desirable states of equipment if global states of enterprise are not approached;
   d. a module for repeating steps b and c above until there is at least one set of hierarchies of possible actions that can achieve the desirable state of global states of enterprise or until all possible sets of identified hierarchy of desirable local and global states of enterprise are exhausted;
   e. a module for updating a historical statistics database with one set of parameters related to local hierarchies of possible actions that can achieve the desirable global states of enterprise.

6. A system as claimed in claim 5, wherein the one or more sets of hierarchies of possible actions are based on multi-objective constraint optimization.

7. A system as claimed in claim 5, wherein the analyzing is based on any one of rule based action, algorithmic optimization, perceptive action or reactive action.

8. A system as claimed in claim 5, wherein the cognitive decision maker uses the parameters related to hierarchies of possible actions as observation to learn the desired behavior.

9. A device for managing energy of an enterprise, comprising:
   a. a sensor that can sense at least one input parameter related to current state of equipment
   b. an adaptor that has a rule set related to energy consumption one or more sets of hierarchies of possible actions related to equipment to reach one or more sets of hierarchies of possible desirable states of an enterprise wherein the one or more sets of hierarchies of possible desirable states of the enterprise are selected from the group consisting of a local state related to equipment and a global state related to the enterprise
   c. a processor that determines at least one possible set of actions based on the hierarchy of desirable local state and global state;
   d. an actuator that can implement the determined set of actions or roll-back as and when needed.

10. A device as claimed in claim 9, wherein the set of hierarchies of possible actions is configured via a network.

11. A device as claimed in claim 9, wherein the set of hierarchies of possible actions is based on an algorithm.

12. A device as claimed in claim 9 or claim 10 or claim 11, wherein the set of hierarchies of possible actions is based on information obtained from a cognitive platform.

13. A device as claimed in claim 9 wherein the sensor senses the current state of equipment and actuator implements the chosen set of actions or roll-back as needed to equipment via an equipment controller.

14. A non-transitory computer-readable medium comprising logic, when executed by a processor operable to:
   a. receive sensory input related to current state of an energy consuming equipment, b. analyze using a cognition based analysis module and identify one or more sets of hierarchies of possible actions to reach one or more sets of hierarchies of possible desirable states of an enterprise wherein the one or more sets of hierarchies of possible desirable states of the enterprise are selected from the group consisting of a local state related to equipment and a global state related to enterprise and choose possible set of actions based on the hierarchy of desirable local and global states of the enterprise;

c. implement the chosen set of actions and re-analyze the current state of equipment and verify whether it approaches the local and global states of enterprise and rolling-back desirable states of equipment if global states of enterprise are not approached;

d. repeat steps b and c above until there is at least one set of hierarchies of possible actions that can achieve the desirable global states of enterprise or until all possible sets of identified hierarchy of desirable local and global states of enterprise are exhausted;

e. updating a historical statistics database with the one set of parameters related to hierarchies of possible actions related to equipment that can achieve the desirable state of enterprise.

\* \* \* \* \*